May 5, 1959     T. F. CARLSON     2,885,236
BALL SUSPENSION JOINTS
Filed July 23, 1956

INVENTOR.
Theodore F. Carlson
BY
Enloe Wilkinson
ATTORNEY

United States Patent Office 2,885,236
Patented May 5, 1959

2,885,236

BALL SUSPENSION JOINTS

Theodore F. Carlson, Englewood, Colo.

Application July 23, 1956, Serial No. 599,489

2 Claims. (Cl. 287—90)

This invention relates to improvements in suspension devices for motor vehicles and more particularly to a ball joint type of suspension commonly used in the front suspension of motor vehicles. This type of suspension is well known in the art and a detailed description of its application to a motor vehicle will be dispensed with.

An object of the invention is to provide a suspension unit that insures a safer and more dependable front end for motor vehicles.

Another object is to provide an improved ball joint that eliminates play and looseness and makes a permanent and lasting suspension.

A further object is to provide a ball joint suspension that absorbs road shock.

Another object is to provide a ball joint that retains grease and prevents the entrance of dirt and moisture.

Another object is to provide a ball joint which holds the front end of a motor vehicle in accurate alignment.

A further object is to provide a ball joint suspension unit which requires no adjustment.

Another object is to provide a ball joint suspension unit which may be quickly installed and which is economical to manufacture.

With these and various other objects in view, the invention may consist of certain novel features, as will be more fully described and particularly pointed out in the specification, drawings and claims appended hereto.

In the drawings, in which like reference characters are used to designate like parts—

Figure 2:
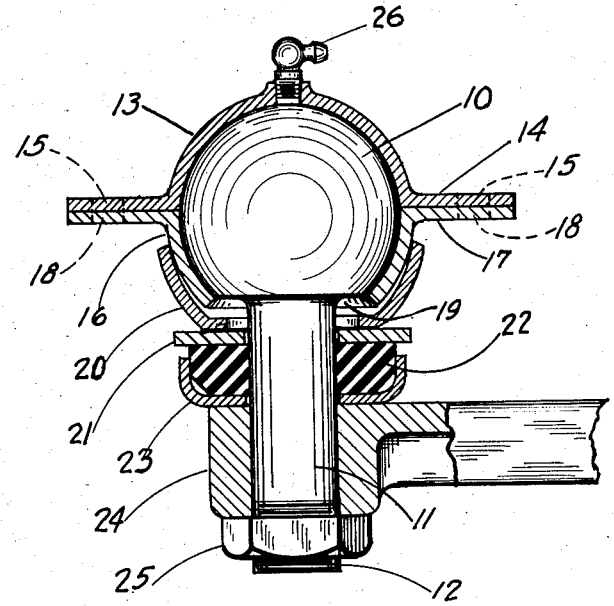
Figure 2 is a sectional view of Figure 1.
Figure 1:
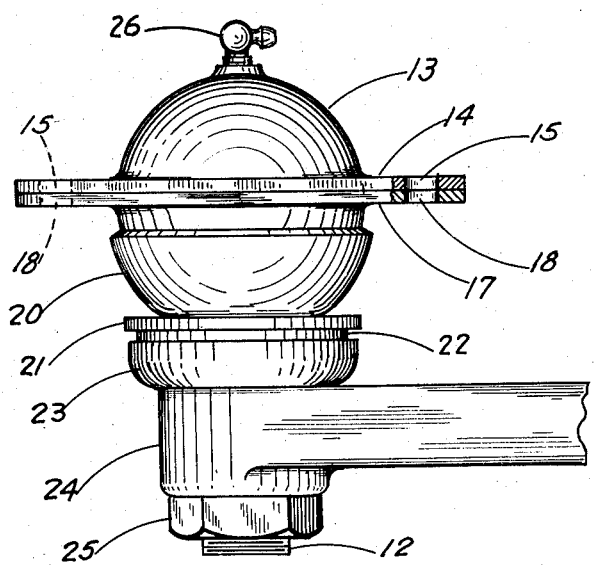
Figure 1 is a side elevational view showing the ball joint and a portion of a supporting arm with a portion of the socket supporting flange shown in cross section.

Referring to the drawing, the ball is indicated at 10 which is provided with a shank 11 having a threaded end 12. The ball 10 is encased in a substantially spherically-shaped socket which is comprised of an upper member 13 having a mounting flange 14, which flange is provided with openings 15. This member may be provided with a grease fitting such as shown at 26. The lower socket member 16 is provided with a corresponding flange 17 having openings 18 in alignment with openings 15 in flange 14. These openings are for the purpose of receiving bolts which secure the suspension joint to the lower control arm of a motor vehicle. The upper and lower members of the socket may be secured together by spot welding. The lower member 16 is provided with a circular opening 19 having a diameter substantially larger than that of the shank 11 to permit the free movement of the ball 10 within the socket.

A thrust washer 20 is mounted over the lower member 16 of the socket and is provided with an opening through which the shank 11 passes. While the drawings show the thrust washer as having a shape somewhat resembling that of a sphere, it is apparent that other shapes which would enable its upper edge to engage the socket could be used. It will be noted that the thrust washer 20 does not completely cover the lower socket member 16 and leaves sufficient room for the washer to oscillate without engaging the flange 17. The contour of the thrust washer need not conform to that of the socket and the same washer may be used in connection with either larger or smaller balls and sockets. If the socket were larger the thrust washer would not seat as far on the socket but the rim of the washer would, nevertheless, seat firmly on the lower member 16 of the socket. In the present embodiment the lower or smaller end of the thrust washer is somewhat flattened to better accommodate retainer washer 21.

Retainer washer 21 is seated against the lower end of thrust washer 20 and provides a seat for the bushing 22 which may be made of rubber or other elastic material, preferably one which is not affected by grease or oil and which may be compressed and which tends to retain its original shape. A cupped washer 23 partly covers the bushing 22 and is positioned on the shank 11 between the bushing and the arm 24. A nut 25 is screwed on the threaded end 12 of the shank 11.

As the nut 25 is tightened the arm 24 is moved upwardly against the cupped washer 23 which compresses the bushing 22 against the retainer washer 21 which abuts the lower end of thrust washer 20, which washer is seated on the outer surface of the lower socket member 16. The effect is to hold the lower portion of the ball 10 against the inner surface of the lower socket member 16.

In ordinary ball suspension joints, when the ball and socket become worn, the ball becomes loose in the socket causing rattles and permitting the front end of the vehicle to become out of alignment. Such looseness permits the entry of dirt and moisture which accelerates further wear on the ball and socket. In the present device the compression of the bushing 22 holds the ball against the socket under tension and yet permits free oscillation of the ball within the socket. Any looseness that might develop as the result of wear is automatically taken up by the expansion of the bushing.

It is apparent that the cupped washer serves to protect the bushing 22 and that the device will function effectively with a flat washer or without any washer.

What is claimed is:

1. A ball suspension joint for motor vehicles comprising a ball mounted in a socket for relative oscillatable movement and having substantially its entire surface in engagement with the inner surface of said socket, means for securing said socket to a motor vehicle, a shank extending from said ball and projecting from said socket, a supporting arm mounted on said shank, a rigid cupped thrust washer mounted on said shank having its surface adjacent the smaller end relatively flat and having the rim adjacent the open side in engagement with said socket and the relatively flat end spaced from said socket, an elastic bushing mounted on said shank, a retainer washer on said shank between said thrust washer and said bushing and seated against the flat surface of the thrust washer, a cupped washer between said arm and said bushing having its open side facing said bushing, said bushing being located between the two cupped washers and a nut on said shank for compressing said bushing and holding said ball in said socket under tension.

2. A ball suspension joint for motor vehicles comprising a ball mounted in a socket for relative oscillatable movement, means for securing said socket to a motor vehicle, a shank extending from said ball and projecting from said socket, a supporting arm mounted on said shank, a rigid substantially cupped-shaped thrust washer mounted on said shank, said thrust washer having its surface adjacent to the smaller end thereof relatively flat, the rim portion of the thrust washer adjacent to the open side being in engagement with the socket and the relatively flat end being spaced from the socket, elastic material mounted on said shank, a cupped washer between said arm and said elastic material having its open side facing said elastic material, said elastic material being located between the two cupped washers and means on said shank on the side of said supporting arm opposite the elastic material means for causing compression of said elastic material means and for holding the ball in the socket under tension.

References Cited in the file of this patent

UNITED STATES PATENTS

| | | |
|---|---|---|
| 2,611,625 | Kishline et al. | Sept. 23, 1952 |
| 2,761,695 | Graham | Sept. 4, 1956 |

FOREIGN PATENTS

| | | |
|---|---|---|
| 478,380 | Canada | Nov. 6, 1951 |